Aug. 25, 1964    E. R. ANDREGG ET AL    3,146,312
COIN TELEPHONE CONTROL APPARATUS
Filed Sept. 18, 1962    2 Sheets-Sheet 1

INVENTORS E. R. ANDREGG
L. A. STROMMEN
BY
ATTORNEY

INVENTORS E. R. ANDREGG
L. A. STROMMEN
BY
ATTORNEY

United States Patent Office 3,146,312
Patented Aug. 25, 1964

3,146,312
COIN TELEPHONE CONTROL APPARATUS
Ernest R. Andregg and Lawrence A. Strommen, Indianapolis, Ind., assignors to Bell Telephone Laboratories, Incorporated, New York, N.Y., a corporation of New York
Filed Sept. 18, 1962, Ser. No. 224,351
8 Claims. (Cl. 179—6.3)

This invention relates to coin operated telephones and more particularly to the control apparatus employed in such instruments. Its general object is to improve the reliability of coin telephones.

A continuing problem in the field of coin operated telephones involves a variety of improper operating procedures, either inadvertent or fraudulent, which may result in providing a customer with telephone service at no cost or at less cost than the preset initial rate. Ideally, service should be provided only under circumstances which include the deposit of the full initial rate and which exclude the return of any part of that deposit to the customer.

There are two principal aspects to the problem of withholding coin telephone service until the deposit of an initial rate. One aspect lies in the means employed to measure the initial rate. The second aspect resides in the means employed to enable the telephone speech network and dial pulse generating apparatus once the initial rate has been deposited. These latter means must of course be in some way responsive to the deposit-measuring means. Typical prior art arrangements employ one or more separate relays for the telephone enabling function and others additionally utilize an extra set of contacts on the coin relay which not only tends to complicate the control circuitry but also restricts its operation to one particular initial rate. Other arrangements in the prior art provide adequate protection against certain types of fraud which may include false grounds, for example, but fail to provide protection against certain improper operating procedures, performed either inadvertently or fraudulently, which may, for example, involve particular sequences of coin deposits and switchhook operations.

A specific object of the invention is to increase the protection against fraudulent operation of a coin telephone.

Another object of the invention is to eliminate any possible offering of service by a coin telephone in response to the deposit of a coin or coins having a value less than a preselected initial rate.

A further object is to preclude any possible offering of service by a coin telephone in response to a particular sequence of operations which involves the return of all or part of the deposited initial rate to the customer.

These and other objects are achieved in accordance with the principles of the invention by coin telephone control apparatus comprising a totalizer mechanism and electronic control circuitry. Key contacts in the control circuitry are operated by cams carried by a rotatable shaft in the totalizer mechanism. In response to the deposit of a coin, the shaft rotates in the forward direction through an angle indicative of the value of the coin. Rotation of the shaft through an angle indicative of the deposit of a coin or coins having a total value equal to some preselected initial rate rotates a rate setting cam to the point at which the cam operates contacts to open a shorting path around the telephone dial pulse contacts, thus readying the dial for operation.

In effect, the totalizer shaft stores coin deposit information as it rotates. The reading out of this stored information is accomplished by resetting the shaft in the reverse direction to its normal or index position. The resetting function is performed by a stepping motor which is arranged to drive a ratchet wheel mounted on the totalizer shaft. With the reverse rotation of the totalizer shaft and of the rate setting cam in the performance of the resetting or read out function, the lobe of the rate cam rotates away from the dial shorting contacts.

In accordance with the invention, a spring-loaded latch is provided which latches up the dial shorting contacts after they have once operated. Consequently, when the totalizer shaft has been returned to its normal or index position, the contacts which open the dial shorting path remain operated and the dial remains ready for use.

The invention also provides a means for resetting the rate contact latch when it is desired to return the totalizer mechanism to its initial predeposit or dial-shorted condition. Specifically, a reset electromagnet is arranged in series circuit relation with the coin relay. The coin relay is conventionally employed to operate the coin hopper vane which finally determines whether deposited coins are collected or returned to the customer. Thus, coin relay operating current is also employed to operate the reset electromagnet. The rate contact latch is removed from under the supporting springs of the rate setting contacts by the armature of the reset electromagnet and thus the control circuitry is returned to the dial-shorted condition.

Under certain conditions of improper operation of the telephone control apparatus by a customer, it is possible to have a coin deposit registered on the totalizer shaft at a time when there are no coins in the coin hopper or collection receptacle. In accordance with the invention an antifraud latch is provided which precludes a customer from receiving telephone service if all or part of an initial deposit has been refunded even though the deposit may have been registered by the totalizer. The antifraud latch maintains the armature of the reset electromagnet in the operated position until the totalizer shaft has been returned to the normal or index position at the termination of a read out cycle. Thus, with the armature of the reset electromagnet locked operated the rate contact latch is precluded from latching up the rate contacts and accordingly the dial pulse contacts remain shorted until a full initial rate has been deposited without the refund of any part thereof. The antifraud latch is operated by an additional cam driven by the totalizer shaft. The additional cam includes a camming lobe that trips the antifraud latch when the totalizer shaft is at the normal or index position.

Accordingly, a feature of the invention is an antifraud latch on a coin telephone totalizer that precludes the unshorting of the telephone dial pulse contacts in the event that any or all of a customer's initial deposit has been refunded.

Another feature of the invention is a coin telephone totalizer which includes the combination of a totalizer shaft driven cam and antifraud latch mechanism that operates to disable a rate control latching mechanism unless the totalizer shaft is returned to its normal position in connection with the operation of a deposit read out mechanism.

The principles of the invention together with additional objects and features thereof will be fully apprehended from a consideration of the following detailed description of an illustrative embodiment of the invention and from the appended drawing, in which.

*Totalizer Structure*

Figure 1:
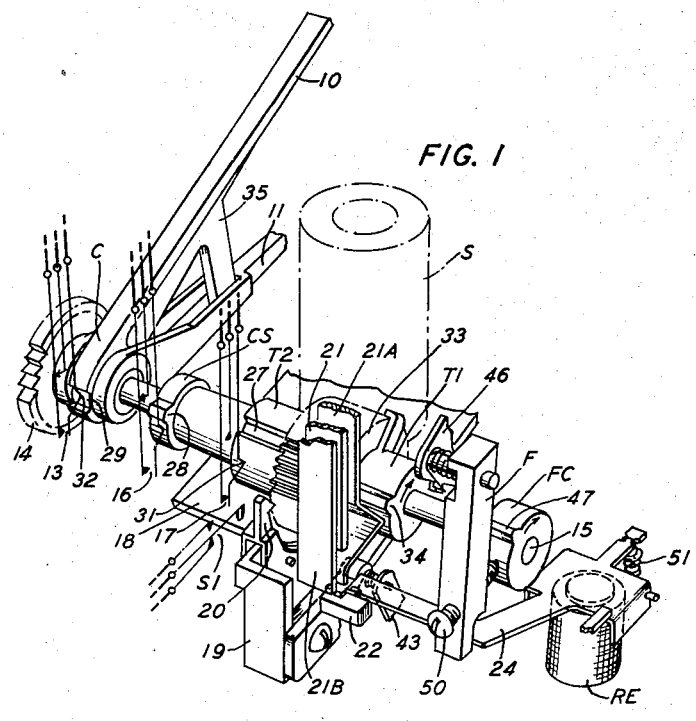
FIG. 1 is a perspective view of coin telephone totalizer apparatus in accordance with the invention.

The totalizer structure shown in FIG. 1 comprises totalizer shaft 15 and cams C, CS, T2 and T1 mounted thereon. Shaft 15 is rotated by the cooperative action of coin arms 10 and 11 and ratchet wheel 14. Coin arms 10 and 11 which are mounted for free rotation on shaft 15 protrude into a coin chute (not shown). Coins in the channels of the coin chute are directed to impinge against the upper surfaces of coin arm 10, in the case of quarters, and against coin arm 11, in the case of nickels or dimes, thus driving the coin arms downwardly. Any rotation of coin arm 11 causes coin arm 10 to rotate also by bearing downwardly on connecting bar 35. Coin arm 10 pivots on shaft 15 independently of coin arm 11, however. The rotation of coin arm 10 is translated by means of a drive spring, not shown, affixed to coin arm 10, into a rotational movement of ratchet wheel 14 which in turn rotates shaft 15. Such coin arms in combination with a ratchet wheel totalizer shaft driver are described in detail in patent application Serial No. 206,265, filed June 29, 1962, by D. W. Peat and L. A. Strommen.

The hub of coin arm 10 forms a cam C with a camming notch 29. Rotation of coin arm 10 raises contact spring 32 out of notch 29 to operate contacts 13. The operation of contacts 13 is employed to disable electrically stepping motor S which is used to drive totalizer shaft 15 in the opposite direction during read out. Any possibility of locking or jamming the totalizer mechanism by having coin arms 10 and 11 drive shaft 15 in one direction with stepping motor S operating to drive shaft 15 in the opposite direction is thereby eliminated.

Cam CS, mounted on shaft 15, includes cam lobe 28 which operates contacts 16. Owing to the combination of an internal key (not shown) on cam CS and an oversized keyway (not shown) on shaft 15, shaft 15 is free to rotate through an arc of approximately 20 degrees before engaging cam CS. At the end of approximately 20 degrees of counterclockwise rotation, shaft 15 engages cam CS and contact spring 30 is lifted by cam lobe 28 to operate contacts 16. The totalizer shaft driving arrangement comprised of coin arms 10 and 11 and ratchet wheel 14 is designed to drive shaft 15 through an arc of approximately 10 degrees for each nickel deposited. Accordingly, neither the deposit of a nickel nor the deposit of a dime operates cam CS. The deposit of a quarter, however, rotates shaft 15 through an angle of approximately 50 degrees, rotating cam CS and operating contacts 16. Contacts 16 are employed in the control circuitry in a manner described in detail below to provide for the generation of coin identification signals at a relatively slow rate in the case of dimes and at a relatively fast rate in the case of quarters.

Cam T2 which may be integral with or fixedly mounted on shaft 15 includes a camming notch 27. When shaft 15 is in the so-called "normal position," that is to say the shaft position before the coin arm mechanism or after the stepping or read out mechanism has operated, contact spring 31 of contacts 17 is engaged by notch 27. In the off-normal condition, however, contact spring 31 is shifted to the high portion of cam T2 and contacts 17 operate in the control circuitry to short the telephone set and to introduce stepping motor S into the circuit. Thus when cam T2 is in the normal position, stepping motor S is shorted by T2 cam contacts 17 and the telephone set is returned to the circuit.

Read out of the coin deposit information which is stored by totalizer shaft 15 in terms of its rotational position, is accomplished by driving ratchet wheel 33 in incremental steps of 10 degrees in the direction shown by the small arrow on shaft 15 until shaft 15 has returned to the normal position. The stepping of ratchet wheel 33 is accomplished through the action of armature 18 of stepping motor S. Armature 18 actuates toggle 20 through connecting link 19 and toggle 20 is arranged to engage the teeth of ratchet wheel 33 in driving relation. Self-interrupting contacts S1, operated by armature 18, control the stepping action of stepping motor S. A substantially similar coin telephone totalizer stepping mechanism is described in detail in patent application Serial No. 209,134, filed July 11, 1962, by D. W. Peat, L. A. Strommen and R. K. Thompson, Jr.

Cam T1 which includes cam lobe 34 is also referred to as the initial rate setting cam in that it must be rotated by shaft 15 through an angle that corresponds to the preselected value of an initial rate before its lobe 34 engages contact spring 21A. Contact spring 21A is urged outwardly toward contact spring 21B, thus operating make contacts 49, shown in FIGS. 4 and 5. The travel of contact spring 21B away from contact support member 21 opens a set of break contacts (not shown) to open a shorting path around the dial pulse contacts of the telephone. This sequence is described in detail below under the heading Operation.

Figures 4, 5:
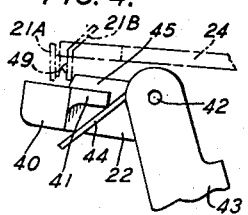
FIG. 4 is a side view of the rate contact latch, shown in FIG. 1, in the operated position.
FIG. 5 is a side view of the rate contact latch, shown in FIG. 1, in the unoperated position.

FIG. 4 shows a rate setting contact latch mechanism comprising a yoke 43 supporting a shaft 42, a latch 22, pivotally mounted on shaft 42, an arm 40, a lip 41 and a ledge 45. In its unoperated position, shown in FIG. 5, latch 22 is spring-loaded against contact spring 21A by spring 44 which has one end bearing against yoke 43 and the other end bearing against lip 41. As spring 21A is engaged by cam lobe 34, the end of spring 21A is forced off ledge 45, permitting latch 22 to rotate upwardly until both contacts springs 21A and 21B are bearing against arm 40, as shown in FIG. 4. Contacts 49 remain latched as described when cam T1 is rotated back to the normal position by the action of the stepping mechanism. Accordingly, the dial pulse contacts remain unshorted and ready for outpulsing.

At the completion of a call it is necessary to return latch 22 to its unoperated position, as shown in FIG. 5. This step is accomplished by reset relay RE and its armature 24. When current is supplied to reset relay RE, by means described in detail below under the heading Operation, armature 24 strikes arm 40 of latch 22, forcing it downwardly, as shown in FIG. 5, allowing contact spring 21A to move from arm 40 to ledge 45, thus opening contacts 49. As a consequence break contacts (not shown) carried by contact spring 21B and contact support 21 are allowed to close.

Figure 2:
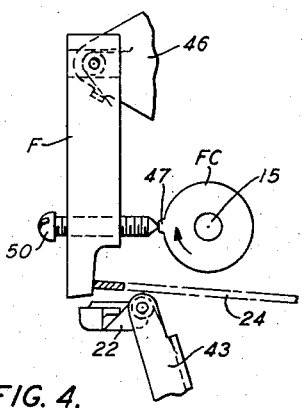
FIG. 2 is a side view of the antifraud latch, shown in FIG. 1, in the operated position.
Figure 3:
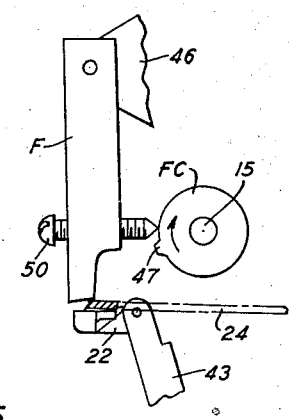
FIG. 3 is a side view of the antifraud latch, shown in FIG. 1, in the unoperated position.

FIG. 2 shows a detailed side view of antifraud latch F which is pivotally mounted on supporting member 46. Totalizer shaft 15 is shown in the normal position which brings camming lobe 47 of cam FC under adjusting screw 50 which moves antifraud latch F away from armature 24, permitting armature 24 to be withdrawn from latch 22 by armature spring 51 (shown in FIG. 1). In this position, latch 22 is free to operate and is spring-loaded against spring 21A, as shown in FIG. 5, and upon the operation of spring 21A by cam lobe 34 of cam T1, latch 22 is permitted to swing upwardly, maintaining contacts 49 in the operated position. FIG. 3 shows the condition of antifraud latch F in the off-normal position. From FIG. 3 it is evident that whenever shaft 15 and cam FC are off-normal and armature 24 is in the operated position, the end of antifraud latch F is permitted to bear against armature 24 which prevents armature 24 from swinging away from latch 22 under the restoring force of spring 51 (shown in FIG. 1). A detailed description of the conditions under which antifraud latch F comes into play in the sequence of totalizer operations is set forth below under the heading Operation.

*Circuit Configuration*

Figure 6:
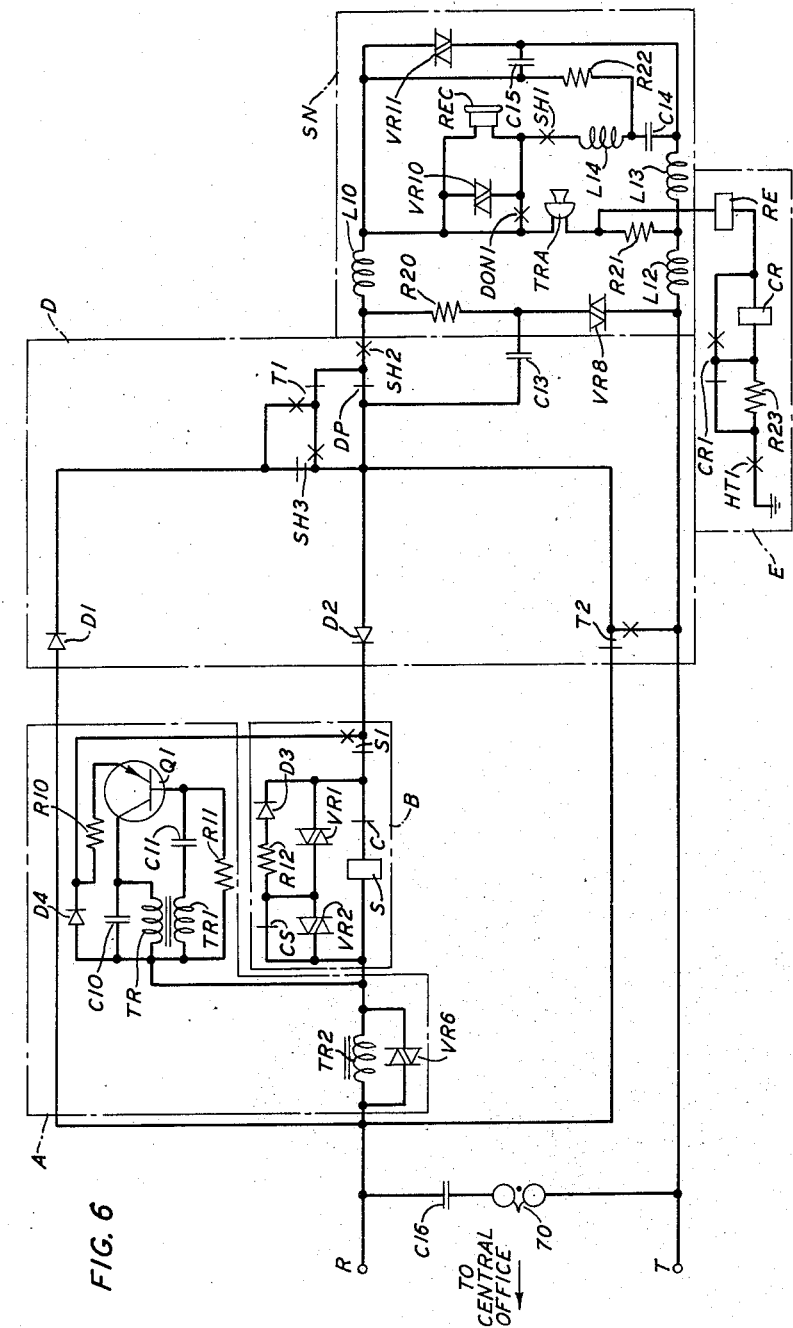
FIG. 6 is a schematic circuit diagram of the control circuitry associated with the totalizer of FIG. 1.

In FIG. 6 the circuitry associated with the totalizer mechanism is illustrated by conventional detached contact notation in which an "X" denotes a make contact and a bar "—" indicates a break contact. To assist in correlating the description of the totalizer mechanism with the description of the associated circuitry, contacts in FIG. 6 operated by the totalizer cams are identified by the corresponding cam designations rather than the contact designations employed in FIG. 1. The circuit shown in FIG. 6 may be classified broadly in terms of sub-circuits which include an oscillator circuit A, a coin identification signal speed control circuit B, a telephone speech network SN, an operating control circuit D and a coin relay and reset relay circuit E. Oscillator circuit A, which generates tone pulse coin identification signals, employs a transistor Q1 with conventional collector-to-base coupling provided by transformer coils TR and TR1. Oscillator A also includes frequency determining capacitors C10 and C11 and biasing resistors R10 and R11. Diode D4, bridged between ring lead R and one terminal of emitter-biasing resistor R10 establishes a fixed reference voltage for oscillator A and also provides a holding path for central office supervisory circuits. Oscillator output is applied to ring lead R by additional transformer winding TR2 shunted by a click suppressor varistor VR6.

The coin identification signal speed control circuit B includes the coil of stepping motor S which is in series with ring lead R. The rate at which stepping motor S operates is determined by the reference voltage across it which in turn is established by the magnitude of the shunting impedance. For low speed action employed to signal the deposit of a nickel or a dime, the impedance shunting stepping motor S results from the series combination of resistor R12 and diode D3 in parallel with varistor VR1. With the deposit of a quarter, however, break contacts CS operate, as explained above, opening the shunt path around varistor VR2. The higher impedance across stepping motor S, resulting from the addition of varistor VR2 to the combination of varistor VR1, resistor R12 and diode D3, raises the voltage across stepping motor S which increases the stepping and signaling rate. Break and make contacts S1, operated by armature 18 of stepping motor S, interrupt the flow of current to the stepping motor and to oscillator A, respectively, thus providing for the stepping action of the motor and the pulsing action of the oscillator. The function of the components of speed control circuit B is explained in further detail below under the heading Operation.

Telephone speech network SN is coupled to ring lead R through switchhook make contact SH2 and inductor L10 and to tip lead T through inductor L12. Speech network SN is wholly conventional and is included herein merely to ensure completeness of disclosure. The upper terminal of transmitter TRA is extended directly to ring lead R and the lower terminal is extended to tip lead T through resistor R21. Receiver REC is similarly bridged between ring lead R and tip lead T through switchhook contact SH1, inductor L14, and capacitor C14. Other elements in speech network SN include dial off-normal contact DON1, resistor R22, capacitor C15, and varistors VR10 and VR11.

Control and logic circuit D include diodes D1 and D2 which provide the logic necessary to detect current reversal in ring lead R when dial tone is applied to the line. Diode D1 provides a shunting path around oscillator A and speed control circuit B for positive current on ring lead R. Negative current on the ring lead is permitted to flow through stepping motor S by diode D2. A shorting path around dial pulse contacts DP is provided through break contact T1 and make contact SH3. Break contact SH3, in its unoperated condition, completes a shorting path around make contact T1. Capacitor C13 provides contact protection for dial pulse contacts DP. Break contact T2 opens a shorting path around stepping motor S, thus readying stepping motor S for operation. Make contact T2 completes a path between ring lead R and tip lead T which shorts out telephone speech network SN.

Coin relay and reset relay circuit E provides a path to ground from tip lead T whenever hopper trigger contact HT1 is operated. This path may be traced from ground through hopper trigger contact HT1, resistor R23, coin relay CR, reset relay RE, and resistor R21. Ground is of course also extended through this path to speech network SN and additionally may be applied to ring lead R through make contact T2. Contacts CR1 are provided to by-pass coin relay CR when it operates and to insert resistor R23 into the line to limit coin relay operating current.

A conventional ringer circuit including ringer 70 in series with capacitor C16 is bridged across the line between ring lead R and tip lead T.

*Operation*

While the coin telephone is idle, the central office monitors the line by connecting positive battery between ring lead R and ground with tip lead T left open. When the customer removes the handset (not shown) switchhook contacts SH1 operate to complete a path, placing receiver REC across the line. Switchhook contacts SH2 operate to complete a path between ring lead R and speech network SN. Break contact SH3 opens a shorting path across rate contacts T1 and make contact SH3 completes a shorting path around dial pulse contacts DP.

With the deposit of any coin, shaft 15 and cam T2 of the totalizer (FIG. 1) rotate off-normal, operating contacts T2. Break contact T2 opens a shorting path around stepping relay S and make contact T2 completes a shorting path across telephone speech network SN.

If the deposit of the first coin does not equal the preselected initial rate, contacts T1 do not transfer and accordingly stepping motor S does not operate and dial pulse contacts DP remain shorted. The coin falling into the hopper (not shown) trips hopper trigger contact HT1 which provides continuity between speech network SN and ground over the path previously described. When the initial rate has been deposited, rate contacts T1 are operated and latched in the operated condition, as previously described. The operation of break contact T1 unshorts dial pulse contact DP, readying the dial for outpulsing. The operation of break contact T1 closes a path from ring lead R to ground through diode D1, make contact T1, make contact SH3, make contact T2, inductor L12, resistor R21, and thence to ground through the elements of coin relay and reset relay circuit E.

The current flow described is recognized by the central office as a start and at this point the central office conventionally applies negative battery to ring lead R and grounds tip lead T, causing loop current to flow in the direction to operate stepping motor S which resets the totalizer to the normal position, as described above. When the totalizer is back in the normal position, speech network SN of the telephone set is unshorted by the release of make contact T2 and the customer hears dial tone. Contacts T1 having been latched in the operated position, as described, do not interfere with dialing at this time. When the call is terminated, the central office conventionally applies a coin pulse to tip lead T. The consequent current flow to ground through the coin relay and reset relay circuit E operates reset relay RE which serves to unlatch contacts T1. Additionally, coin relay CR is operated to collect or refund coins held in the coin hopper.

Under particular circumstances it is possible to have the position of the totalizer shaft indicate the receipt of a deposit when in fact the deposited coin has been refunded. More specifically, if a coin such as a nickel, for example, is deposited before the switchhook has been operated, the coin will operate the totalizer, tripping hopper trigger contact HT1, terminating its travel in the coin hopper (not shown). As described above, the central office will receive a start-request, dial tone will be applied to the line and the totalizer will be read out. When the totalizer is read out, however, an abandoned call is made evident to the central office by virtue of the unoperated switchhook contacts and dial battery is removed from the line. At this point, conventional procedure at the central office calls for the application of a refund pulse to coin relay CR, operating the coin hopper vane which returns the coin to the customer. A coin hopper vane operated by a coin relay in response to a central office signal to effect coin disposal, that is to say collection or refund, is a combination well known in the art as shown, for example, in Patent 2,241,452, issued to J. S. Franks, May 13, 1941. If, at this point, the customer deposits another coin such as another nickel, for example, the totalizer is moved off-normal although the coin drops into the hopper while the first coin is being refunded and accordingly both coins may be refunded to the customer although the totalizer retains the information indicating the deposit of the second coin. As explained above, reset electromagnet RE operates whenever current is applied to operate coin relay CR.

As shown in FIG. 3, the operation of reset electromagnet RE forces armature 24 against latch 22, moving latch 22 away from springs 21A and 21B. Cam FC is in the off-normal position, however, and as a result antifraud latch F bears against the end of armature 24 which precludes latch 22 from swinging under contact spring 21B as shown in FIG. 4. Antifraud latch F cannot be released until the totalizer returns to the normal position at which point antifraud latch F is shifted to permit armature 24 to swing away from latch 22. In the absence of antifraud latch F the following sequence of operations could occur after the refund of the second coin as described above. The customer removes the handset and deposits a third coin such as another nickel for example, and the third coin together with the second coin equals the initial rate which for illustrative purposes in this instance is assumed to be ten cents. Contacts T1 are transferred at this point and the coin last deposited enters the hopper. The central office recognizes a service request, applies dial tone and the totalizer is read back. It is evident that in the absence of antifraud latch F, contacts T1 would be latched up, unshorting the dial and the customer would be provided with service for an actual deposit which is less than the initial rate. In essence, then an antifraud latch in accordance with the invention precludes latching up the initial rate control contacts unless the totalizer is in the normal position. With an antifraud latch in accordance with the invention the sequence of operations performed by a customer as described, whether inadvertent or fraudulent, will not result in providing telephone service at less than the initial rate.

Coin Signal Generation

As explained above, the resetting of the totalizer is accomplished by stepping motor S which is permitted to operate through its pulsing break contact S1, driven by armature 18 (FIG. 1). With the alternate transfer of make and break contacts S1, pulsed energy is also applied to operate oscillator A as the totalizer is reset to normal. With the deposit of a nickel or a dime, break contact CS remains unoperated and the voltage across stepping motor S is established by the shunting impedance of the parallel circuit comprising varistor VR1, resistor R12 and diode D3. With the deposit of a quarter, break contact CS operates in the manner indicated above, the shunt path around varistor VR3 is opened and the impedance and consequently the voltage across stepping motor S is increased. With stepping motor S cycling five times for the read out of a deposited quarter, five coin identifying pulses are generated at the high speed rate which may be on the order of 15 to 18 pulses per second. A corresponding illustrative rate for the low speed pulses is on the order of 5 to 7 pulses per second.

Varistors VR1 and VR2 have symmetrical bidirectional properties and in one direction the voltage drop across varistor VR1 or across varistors VR1 and VR2 controls the current flowing through stepping motor S and hence the speed at which the stepping motor S operates. When contacts S1 transfer, opening the current path of stepping motor S at break contact S1, current tends to continue to flow through stepping motor S in the same direction. With the supply path open, however, current travels back around through varistor VR1 or through varistors VR1 and VR2 in the opposite direction and it is this current that regulates the release time of the armature of stepping motor S. This arrangement permits the pulsing rate to be changed without changing the pulse duty cycle. Stated otherwise, in the high speed condition the armature of stepping motor S operates faster and also releases faster than in the low speed condition so that the signal pulse duty cycle remains substantially constant. A symmetrical varistor combination is employed in lieu of a diode for the reason that although a diode may have the proper voltage drop in the direction that controls stepping motor armature operate time, it would not necessarily have the same resistance in the direction that controls armature release time.

Incoming Call

When the coin telephone is called from another station, the answering party can trip ringing and talk because the totalizer is left in the normal position after any preceding call. On incoming collect calls, the call may be routed to an operator's position in order to monitor transient coin signals. The operator's position may then apply negative battery to ring lead R with tip lead T grounded, causing the totalizer to be read out immediately following any deposit.

Abandoned Call

When a customer abandons a call, after having deposited a coin, switchhook contact SH3, unoperated, shorts out make contact T1, causing the central office to find ring lead R grounded through diode D1, switchhook contact SH3, make contact T2, inductor L2, resistor R21, and the coin relay reset relay circuit E. The central office accordingly detects a start and applies negative dialing battery, which permits stepping relay S to reset the totalizer. As soon as the totalizer is returned to the normal position, the central office finds contact SH2 opened and accordingly will disconnect and apply coin refund potential to tip lead T. With this type of operation, the central office restores the totalizer to the normal operating condition and refunds any deposit on an incompleted abandoned call regardless of when the deposit was made.

Automatic Overtime

After a predetermined time, the initial rate may be collected to operate hopper trigger contact HT1 and notify the customer that an overtime deposit is required. Upon receiving an overtime deposit, the totalizer moves off-normal and is immediately stepped back irrespective of the value of the initial rate because negative talking battery is present on the line. Shortly thereafter, the central office may check for a ground path through hopper trigger contact HT1 which will of course be closed again if a coin has been deposited.

False Ground Protection

As previously described, false ground protection is accomplished by shorting out dial pulse contacts DP by means of the shorting path which includes break contact T1. If the customer applies a false ground, the central office will recognize a start signal and bring in dial tone and battery. Nevertheless, dial pulse contacts DP remain shorted, thus preventing a free call. This arrangement is in contrast to certain prior art coin telephone control circuits which employ a second hopper trigger contact on the coin relay as a dial-shorting contact. Such an arrangement provides false ground control for the first nickel deposit only. In accordance with the invention as described, however, false ground protection is achieved without regard to the particular initial rate and without introducing any other possibilities of achieving electrical fraud such as by manipulation of the switchhook, manipulation of the dial pulse contacts or by dropping coins in at particularly select times.

What is claimed is:

1. A coin operated telephone comprising, in combination, totalizer apparatus including a totalizer shaft normally at rest in an index position, means responsive to the deposit of a coin for rotating said shaft off said index position, said telephone includuing normally disabled dial pulse generating means, means responsive to the deposit of a coin or coins equal in value to a preselected initial rate for enabling said generating means, means responsive to the operation of said enabling means for maintaining said enabling means in the operated condition, means jointly responsive to the positioning of said shaft in said index position and to the disposal of a coin for returning said maintaining means to an unoperated condition thereby allowing said enabling means to return to an unoperated condition, and means jointly responsive to the positioning of said shaft in a position other than said index position and to the disposal of a coin for disabling said maintaining means so long as said shaft is in a position other than said index position, thereby precluding the operation of said generating means without a full nonrefunded deposit of said initial rate.

2. Apparatus in accordance with claim 1 including a path normally shorting said generating means, said enabling means including means for opening said shorting path, and an initial rate cam mounted on said shaft, said cam including a camming lobe positioned by the rotation of said shaft through an angle indicative of the deposit of a coin or coins equal in value to said initial rate to operate said opening means.

3. Apparatus in accordance with claim 1 wherein said enabling means includes contacts normally, in an unoperated condition, providing a shorting path across said generating means, an initial rate cam rotated by said shaft and positioned thereby to operate said contacts upon the rotation of said shaft through an angle indicative of the deposit of a coin or coins equal in value to said initial rate, and spring members supporting said contacts, said maintaining means comprising a mechanical latch spring-loaded against the ends of said members and normally responsive to the operation of said contacts by said cam for latching said contacts in the operated position.

4. Apparatus in accordance with claim 1 wherein said enabling means includes contacts normally in an unoperated condition, normally completing a shorting path across said generating means, said maintaining means comprising a first latch normally operatively responsive to the operation of said contacts for holding said contacts in the operated position, said apparatus further including a conducting circuit path, a coin relay and a reset relay, including an armature, in series relation in said circuit path, said returning means comprising said reset relay and the armature thereof, and said armature being positioned upon operation of said reset relay to trip said first latch whereupon said contacts are released to their normal or unoperated position.

5. Apparatus in accordance with claim 4 wherein said disabling means includes a cam mounted on said shaft, a second latch jointly responsive to the rotation of said shaft to an off-index position and to the operation of said armature for holding said armature in the operated position thereby to disable said first latch so long as said shaft is off-index, and means including said cam for tripping said latch in response to the return of said shaft to said index position.

6. A coin operated telephone comprising, in combination, a totalizer mechanism including a shaft normally in an index position, first means responsive to the deposit of coin for rotating said shaft off said index position in a forward direction through an angle indicative of the value of said coin, second means responsive to the deposit of a coin or coins equal in value to a preselected initial rate for rotating said shaft in a reverse direction back to said index position in discrete incremental steps, each of said steps being indicative of the value of a minimum deposit coin, first means for generating dial pulse signals, second means responsive to said second rotating means for generating coin identification tone pulses indicative by number and by repetition rate of the value of deposited coins, means responsive to said first rotating means for enabling said second rotating means, means responsive to the deposit of a coin or coin or coins equal in value to said initial rate for enabling said second generating means, means responsive to the operation of said enabling means for maintaining said enabling means in the operated condition irrespective of the operation of said second rotating means, means operable from a remote station so long as said shaft is on said index position for returning said maintaining means to an operable but unoperated condition, and means including said returning means operable from said remote station so long as said shaft is off-index for disabling said maintaining means.

7. Apparatus in accordance with claim 6 wherein said enabling means includes a set of contacts operatively responsive to an initial rate setting cam mounted on said shaft, wherein said maintaining means comprises a first mechanical latch spring-loaded against said contacts and positioned to fall beneath said contacts upon the operation thereof, thereby to hold said contacts in the operated position, wherein said returning means includes a reset relay having an armature positioned to shift said first latch to its unoperated condition upon the operation of said relay, and wherein said disabling means comprises a second latch and an antifraud cam mounted on said shaft, said second latch being positioned to hold said armature in its operated position after the operation of said relay, and said second latch being shifted clear of said armature by said antifraud cam upon the return of said shaft to said index position.

8. A coin operated telephone comprising, in combination, a totalizer mechanism including a rotatable shaft normally in an index position, first means responsive to the deposit of a coin for rotating said shaft in a forward direction from said index position through an angle indicative of the value of said coin, second means responsive to the deposit of a coin or coins equal in value to a preselected initial rate for rotating said shaft in a reverse direction in discrete incremental step back to said index position, the magnitude of each of said steps being indicative of a minmum deposit coin, said telephone including normally disabled dial pulse generating means, means responsive to the deposit of a coin or coins equal in value to said initial rate for enabling said generating means, means responsive to the operation of said enabling means for latching said enabling means in an operated condition, and means jointly responsive to the positioning of said shaft at a point corresponding to the deposit of said initial rate and to the application of a signal from an outside source for disabling said latching means thereby permitting said enabling means to return to an unoperated condition upon the operation of said second rotating means, said disabling means being returned to an unoperated condition upon the return of said shaft to said index position.

No references cited.